(12) United States Patent
Huang et al.

(10) Patent No.: US 11,884,416 B2
(45) Date of Patent: *Jan. 30, 2024

(54) ELECTRIC GENERATOR

(71) Applicant: General Electric Company, Schenectady, NY (US)

(72) Inventors: Hao Huang, Troy, OH (US); David Dimitri Karipides, Casstown, OH (US); Jia Xiaochuan, Centerville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,335

(22) Filed: Jan. 30, 2023

(65) Prior Publication Data

US 2023/0166859 A1    Jun. 1, 2023

Related U.S. Application Data

(63) Continuation of application No. 16/843,243, filed on Apr. 8, 2020, now Pat. No. 11,565,824.

(51) Int. Cl.
| | |
|---|---|
| *H02K 3/00* | (2006.01) |
| *B64D 41/00* | (2006.01) |
| *H02K 11/27* | (2016.01) |
| *F02C 7/32* | (2006.01) |
| *H02K 7/18* | (2006.01) |
| *H02K 7/20* | (2006.01) |
| *H02K 11/049* | (2016.01) |

(52) U.S. Cl.
CPC ............... *B64D 41/00* (2013.01); *F02C 7/32* (2013.01); *H02K 3/00* (2013.01); *H02K 7/1823* (2013.01); *H02K 7/20* (2013.01); *H02K 11/049* (2016.01); *H02K 11/27* (2016.01); *B64D 2221/00* (2013.01); *F05D 2220/762* (2013.01)

(58) Field of Classification Search
CPC .......... H02K 3/00; H02K 7/1823; H02K 7/20
See application file for complete search history.

(56) References Cited

U.S. PATENT DOCUMENTS

| | | |
|---|---|---|
| 3,794,870 A | 2/1974 | Broadway et al. |
| 4,132,914 A | 1/1979 | Khutoretsky et al. |
| 5,198,972 A | 3/1993 | Lafuze |
| 5,406,186 A | 4/1995 | Fair |
| 5,430,362 A | 7/1995 | Carr et al. |
| 5,764,036 A | 6/1998 | Vaidya et al. |
| 5,914,590 A | 6/1999 | Wacknov et al. |
| 6,501,205 B1 | 12/2002 | Asao et al. |
| 6,617,718 B2 | 9/2003 | Oohashi et al. |
| 6,844,707 B1 | 1/2005 | Raad |
| 7,944,187 B2 | 5/2011 | Dooley |
| 8,358,111 B2 | 1/2013 | Rozman et al. |

(Continued)

*Primary Examiner* — Dang D Le
(74) *Attorney, Agent, or Firm* — Dority & Manning, P.A.

(57) ABSTRACT

An electric generator assembly for an aircraft is provided. The electric generator assembly includes: a main generator having a main rotor and a main stator, the main stator includes a first three-phase winding and a second three-phase winding, the first and second three-phase windings each configured to have a voltage induced therein by the main rotor, the first three-phase winding defining a phase shift from the second three-phase winding greater than zero degrees.

18 Claims, 4 Drawing Sheets

(56) References Cited

U.S. PATENT DOCUMENTS

| | | |
|---|---|---|
| 8,492,920 B2 | 7/2013 | Huang et al. |
| 8,633,629 B2 | 1/2014 | Kashihara |
| 8,704,473 B2 | 4/2014 | Harbourt et al. |
| 8,723,349 B2 | 5/2014 | Huang et al. |
| 8,723,385 B2 | 5/2014 | Jia et al. |
| 9,680,344 B2 | 6/2017 | Atalla et al. |
| 10,378,445 B2 | 8/2019 | Edwards et al. |
| 11,565,824 B2 * | 1/2023 | Huang .................. H02K 11/27 |
| 2004/0027078 A1 | 2/2004 | Xu et al. |
| 2018/0309397 A1 | 10/2018 | De Wergifosse |
| 2019/0257211 A1 | 8/2019 | Huang et al. |

* cited by examiner

ELECTRIC GENERATOR

CROSS-REFERENCE TO RELATED APPLICATIONS

The present application is a continuation of U.S. application Ser. No. 16/843,243, filed on Apr. 8, 2020, which is hereby incorporated by reference in its entirety.

FIELD

The present subject matter relates generally to an electric generator assembly, such as an electric generator assembly for an aircraft electrical system.

BACKGROUND

For certain aeronautical vehicles, electric generators may be included to provide an electrical DC power output to power various DC aircraft loads. For example, the electric DC generators may provide electrical power to various control systems of the aircraft, cabin systems, and/or propulsion systems (such as electric propulsors). Due to ripple issues at the output of the electric generators, these electric generators typically include relatively large capacitors in order to minimize the large ripples. Inclusion of relatively large capacitors may undesirably increase a weight of the electrical system. Accordingly, an electric DC generator capable of providing electrical power with reduced ripples with smaller capacitors would be useful.

BRIEF DESCRIPTION

Aspects and advantages of the invention will be set forth in part in the following description, or may be obvious from the description, or may be learned through practice of the invention.

In an aspect of the present disclosure, an electric generator assembly for an aircraft is provided. The electric generator assembly includes: a main generator having a main rotor and a main stator, the main stator comprising a first three-phase winding and a second three-phase winding, the first and second three-phase windings each configured to have a voltage induced therein by the main rotor, the first three-phase winding defining a phase shift from the second three-phase winding greater than zero degrees.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
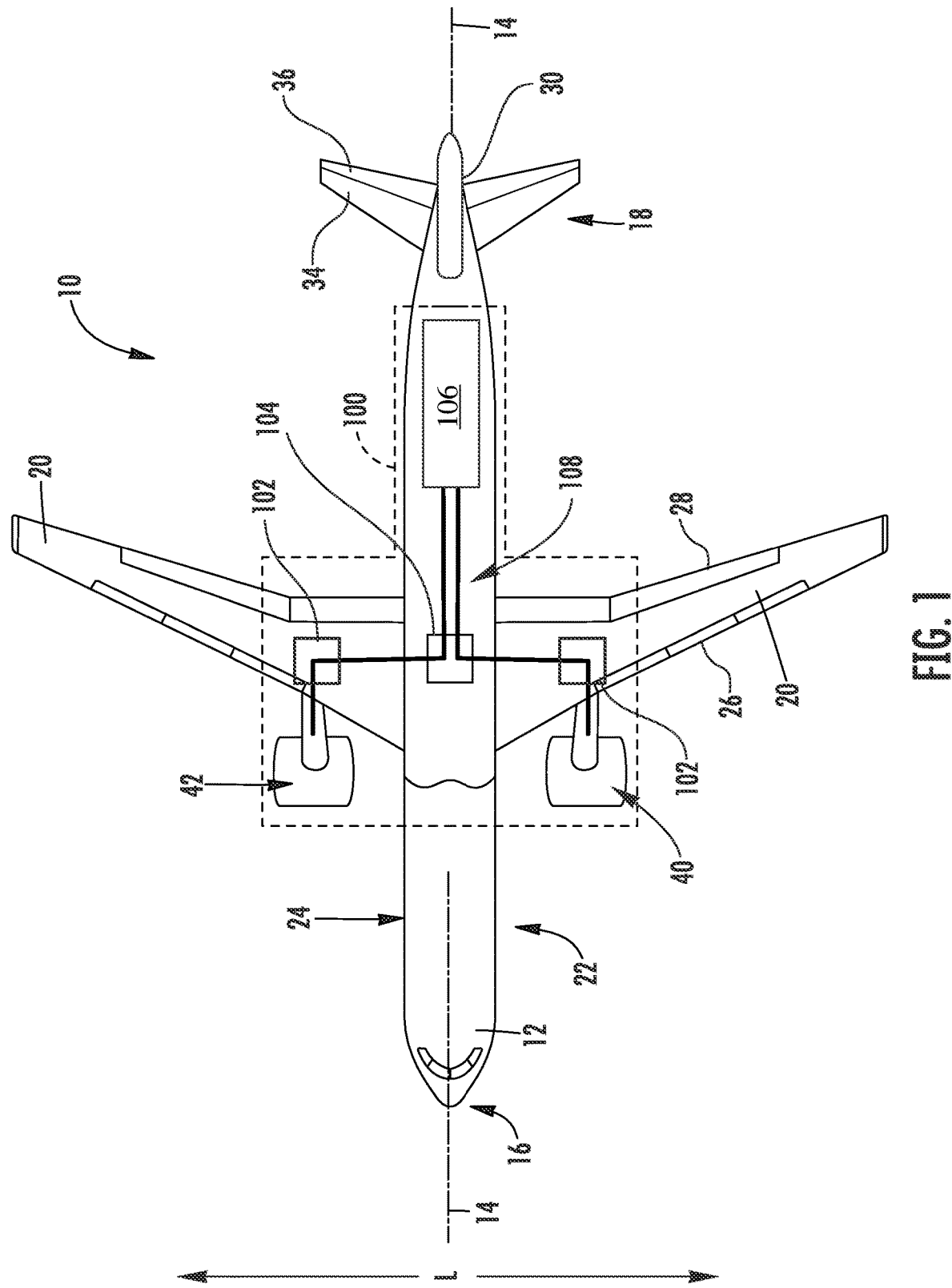
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a gas turbine engine, forward refers to a position closer to an inlet of the gas turbine engine and aft refers to a position closer to an exhaust of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a top view of an exemplary aircraft 10 as may incorporate various embodiments of the present invention. As shown in FIG. 1, the aircraft 10 defines a longitudinal centerline 14 that extends therethrough, a lateral direction L, a vertical direction (not shown; perpendicular to the lateral direction L and longitudinal centerline 14), a forward end 16, and an aft end 18. Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Each of the wings 20 for the exemplary embodiment depicted includes one or more leading edge flaps 26 and one or more trailing edge flaps 28. The aircraft 10 further includes a vertical stabilizer 30 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

The exemplary aircraft 10 of FIG. 1 further includes a propulsion system having one or more aircraft engines. For example, the embodiment depicted includes a plurality of aircraft engines, each configured to be mounted to the aircraft 10, such as to one of the pair of wings 20. More specifically, for the embodiment depicted, the aircraft engines are configured as gas turbine engines, or rather as turbofan jet engines 40, 42 attached to and suspended beneath the wings 20 in an under-wing configuration. It should be appreciated, however, that in other embodiments the aircraft engines may be configured in any other suitable manner and may be mounted at any suitable location (e.g., fuselage mounted at the tail end 18).

Referring still to the embodiment of FIG. 1, the aircraft 10 further includes an electrical system 100. For the embodiment show, the electrical system includes one or more electric generators 102 operable with the jet engines 40, 42. For example, one or both of the jet engines 40, 42 may be configured to provide mechanical power from a rotating shaft (such as an LP shaft or HP shaft) to the electric generators 102. Although depicted schematically outside the respective jet engines 40, 42, in certain embodiments, the electric generators 102 may be positioned within a respective jet engine 40, 42. Additionally, the electric generators 102 may be configured to convert the mechanical power to electrical power. For the embodiment depicted, the electrical system 100 includes an electric generator 102 for each jet engine 40, 42, and also includes an energy storage device 104. The electric generators 102 may send electrical power to the energy storage device 104, which may store the energy in the energy storage device 104.

Further, it will be appreciated that the electrical system 100 includes one or more electrical loads 106. The one or more electrical loads 106 may be one or more aircraft loads (such as one or more control system loads, cabin loads, etc.), one or more propulsion system loads (such as one or more electric or hybrid electric propulsors), or both. In certain exemplary embodiments, the electrical power provided from the electric generators 102 may be stored in the energy storage device 104, may be sent to the electrical loads 106, or both.

Notably, for the embodiment show, the electric generators 102, energy storage device 104, and electrical loads 106 are all are connected to an electric communication bus 108, such that the electric generator 102 may be in electrical communication with these components through the electric communication bus 108.

It should be appreciated, however, that the aircraft 10 and electrical system 100 depicted in FIG. 1 is provided by way of example only and that in other exemplary embodiments of the present disclosure, any other suitable aircraft 10 may be provided having an electrical system 100 configured in any other suitable manner.

Figure 2:
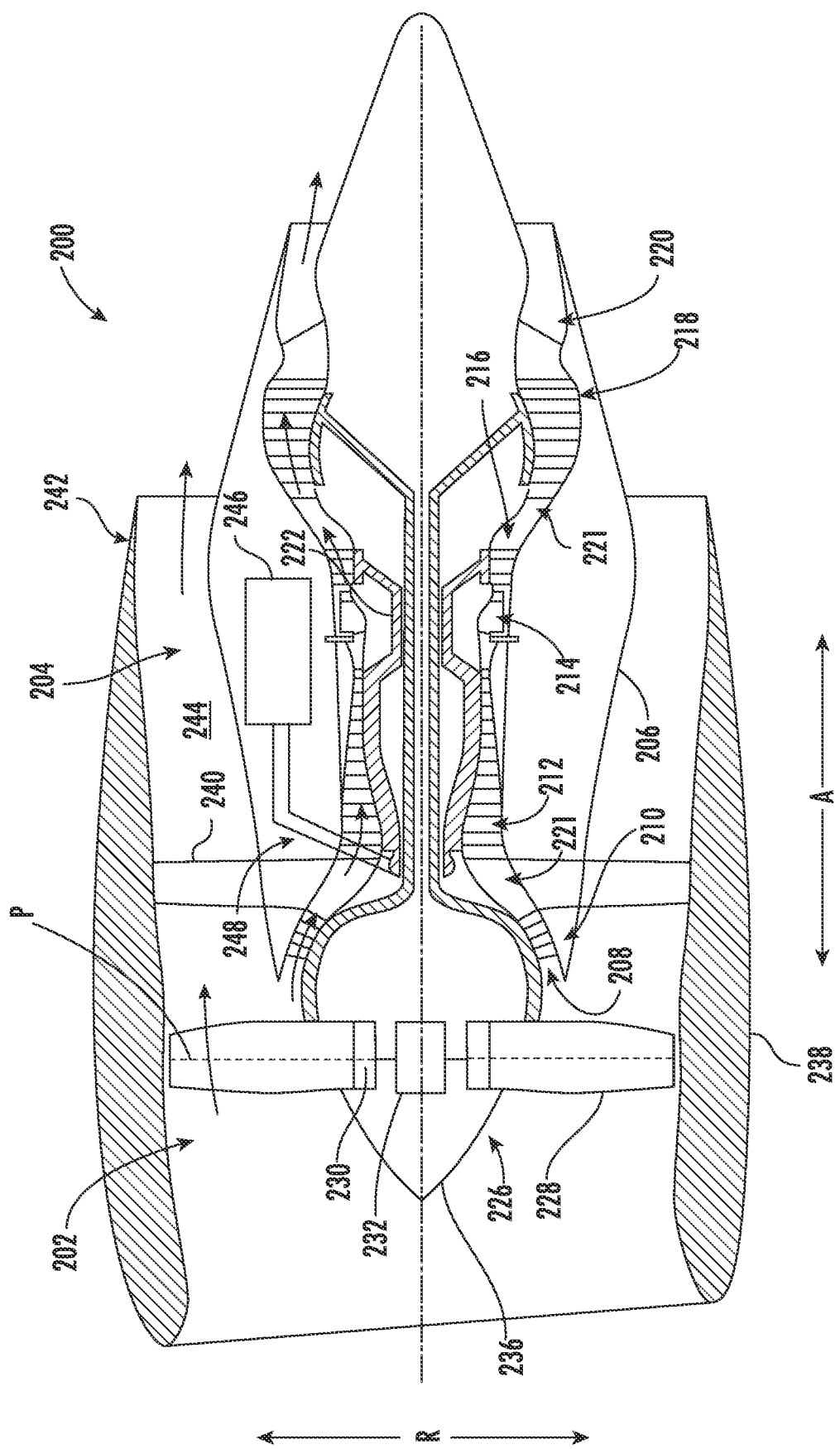
FIG. 2 is a schematic, cross-sectional view of a gas turbine engine in accordance with an exemplary aspect of the present disclosure.

Referring now to FIG. 2, a schematic cross-sectional view of a propulsion engine in accordance with an exemplary embodiment of the present disclosure is provided. In certain exemplary embodiments, the propulsion engine may be configured a high-bypass turbofan jet engine 200, herein referred to as "turbofan 200." Notably, in at least certain embodiments, the jet engines 40, 42 may be also configured as high-bypass turbofan jet engines. In various embodiments, the turbofan 200 may be representative of jet engines 40, 42. Alternatively, however, in other embodiments, the turbofan 200 may be incorporated into any other suitable aircraft 10.

As shown in FIG. 2, the turbofan 200 defines an axial direction A (extending parallel to a longitudinal centerline 201 provided for reference), a radial direction R, and a circumferential direction (extending about the axial direction A; not depicted in FIG. 2). In general, the turbofan 200 includes a fan section 202 and a turbomachine 204 disposed downstream from the fan section 202.

The exemplary turbomachine 204 depicted generally includes a substantially tubular outer casing 206 that defines an annular inlet 208. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. The compressor section, combustion section 214, and turbine section together define a core air flowpath 221 extending from the annular inlet 208 through the LP compressor 210, HP compressor 212, combustion section 214, HP turbine section 216, LP turbine section 218 and jet nozzle exhaust section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

For the embodiment depicted, the fan section 202 includes a variable pitch fan 226 having a plurality of fan blades 228 coupled to a disk 230 in a spaced apart manner. As depicted, the fan blades 228 extend outwardly from disk 230 generally along the radial direction R. Each fan blade 228 is rotatable relative to the disk 230 about a pitch axis P by virtue of the fan blades 228 being operatively coupled to a suitable actuation member 232 configured to collectively vary the pitch of the fan blades 228 in unison. The fan blades 228, disk 230, and actuation member 232 are together rotatable about the longitudinal centerline 14 by the LP shaft 224.

Referring still to the exemplary embodiment of FIG. 2, the disk 230 is covered by rotatable front hub 236 aerodynamically contoured to promote an airflow through the plurality of fan blades 228. Additionally, the exemplary fan section 202 includes an annular fan casing or outer nacelle 238 that circumferentially surrounds the fan 226 and/or at least a portion of the turbomachine 204. The nacelle 238 is supported relative to the turbomachine 204 by a plurality of circumferentially-spaced outlet guide vanes 240. A downstream section 242 of the nacelle 238 extends over an outer portion of the turbomachine 204 so as to define a bypass airflow passage 244 therebetween.

Additionally, the exemplary turbofan 200 depicted includes an electric generator assembly 246 rotatable with one or more rotatable components of the turbofan engine 200. Specifically, for the embodiment depicted, the electric generator assembly 246 is rotatable with a high pressure/ high speed system of the turbofan engine 200, and more specifically still, is rotatable with the HP spool 222 through a drivetrain 248. In such a manner, the electric generator assembly 246 may be configured to generate electrical power based on a rotation of the turbofan engine 200. Notably, the electric generator assembly 246 may be configured as part of an electrical system of an aircraft incorporating the electric generator assembly 246, and as such, may be electrically coupled to an electric bus (similar to the electrical system 100 of an aircraft 10, having generators 102 electrically coupled to the electric bus 108).

It should be appreciated, however, that the exemplary turbofan engine 200 depicted in FIG. 2 is provided by way of example only, and that in other exemplary embodiments, the turbofan engine 200 may have any other suitable configuration. For example, in other exemplary embodiments, the turbofan engine 200 may be configured as a turboprop engine, a turbojet engine, a differently configured turbofan engine, or any other suitable gas turbine engine. Additionally, although the exemplary electric generator assembly 246 is depicted in FIG. 2 as being located within the casing 206 of the turbofan engine 200, in other embodiments, it may be located at any other suitable location. Further, for example, although the electric generator assembly 246 is depicted as being rotatable with a thrust-producing engine, in other exemplary embodiments, the electric generator assembly 246 may instead be operable with a non-thrust producing combustion engine, such as a dedicated turboshaft engine, e.g., in an auxiliary power unit.

Figure 3:
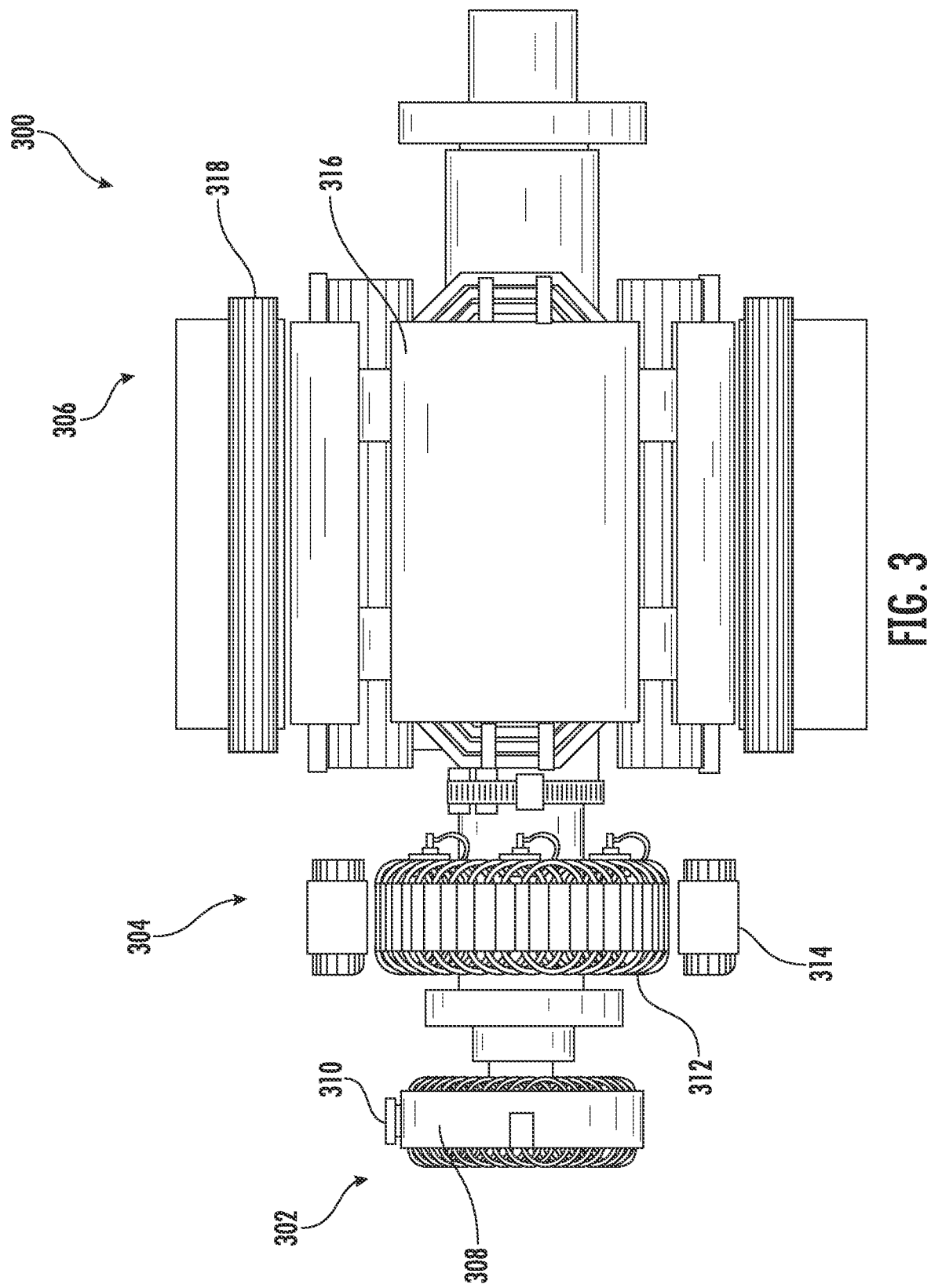
FIG. 3 is a side view of an electric generator assembly in accordance with an exemplary embodiment of the present disclosure.

Referring now to FIG. 3, an electric generator assembly 300 in accordance with an exemplary embodiment of the present disclosure is provided. The electric generator assembly 300 of FIG. 3 may be configured in the same manner as the exemplary electric generator assembly 246 described above with reference FIG. 2, may be incorporate into the exemplary electrical system 100 of the aircraft 10 described above with reference to FIG. 1, or alternatively, may be operable with any other suitable combustion engine and/or any other suitable electrical system of an aircraft.

As will be appreciated, the exemplary electric generator assembly 300 of FIG. 3 generally includes three machines. In particular, the exemplary electric generator assembly 300 of FIG. 3 includes a permanent magnet generator (PMG) 302, an exciter 304, and a main generator 306. The PMG 302 includes a PMG rotor 308 and a PMG stator 310, the exciter 304 includes an exciter rotor 312 and an exciter stator 314, and the main generator 306 includes a main generator rotor 316 and a main generator stator 318.

Figure 4:
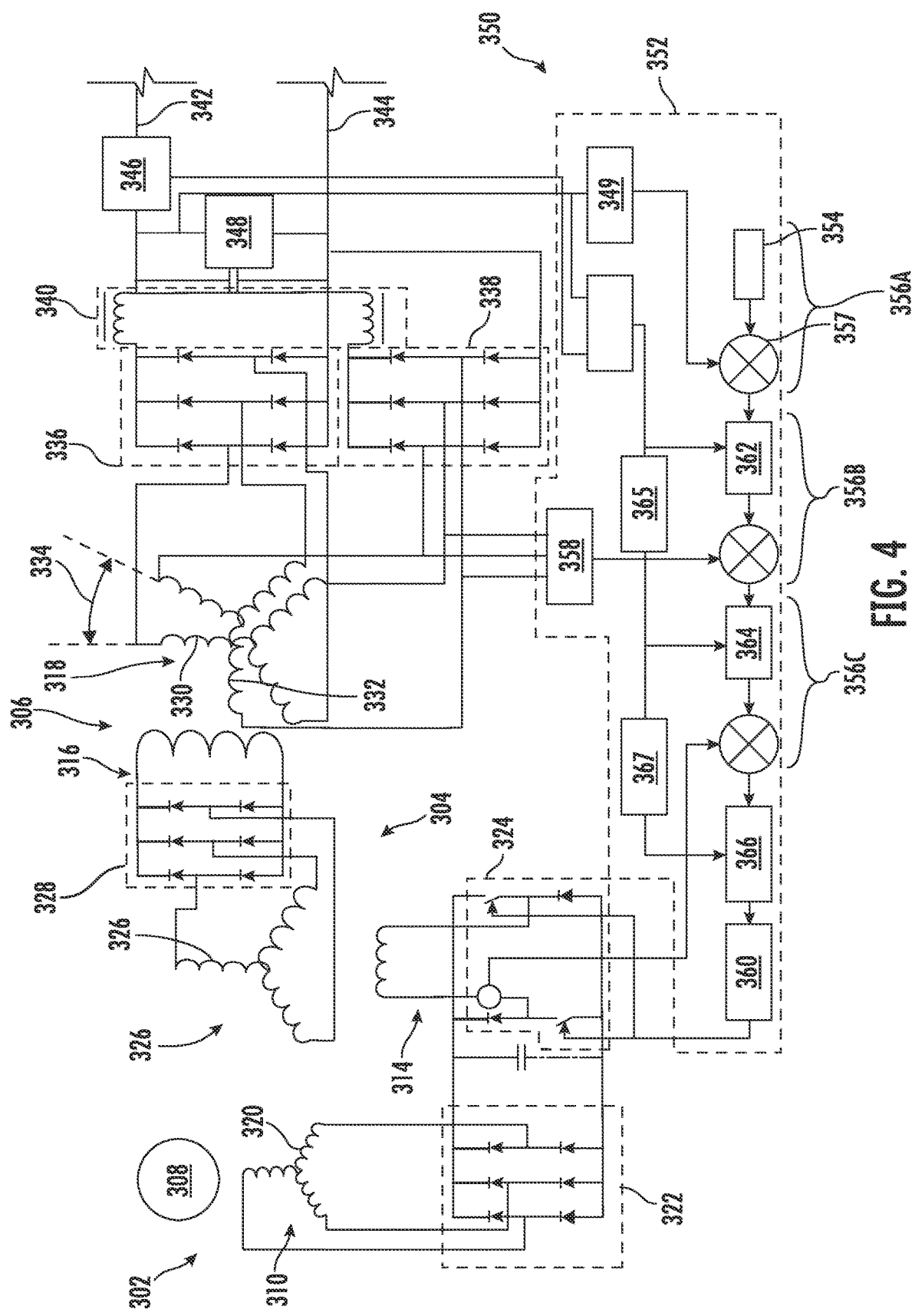
FIG. 4 is a schematic of the exemplary electric generator assembly of FIG. 3.

Referring now also to FIG. 4, operation of the electric generator assembly 300 will be described in greater detail. In particular, FIG. 4 provides a schematic of the exemplary electric generator assembly 300 of FIG. 3.

Referring first to the PMG 302, the PMG rotor 308 may include one or more permanent magnets, and may be rotatable by a rotating component of an engine (see, e.g., FIG. 2). For example, when configured in accordance with the exemplary electric generator assembly 246 of FIG. 2, the PMG rotor 308 may be rotatable with the HP spool 222 of the turbofan engine 200. Rotation of the PMG rotor 308 relative to the PMG stator 310 may induce a voltage within the PMG stator 310. Particularly, for the embodiment shown, the PMG stator 310 includes a PMG three-phase winding 320. As such, the PMG stator 310 generates a three-phase AC voltage.

The exemplary electric generator assembly 300 is configured to provide power from the PMG stator 310 to the exciter stator 314. However, as will be appreciated from the schematic of FIG. 4, the electric generator assembly 300 is configured to condition the power prior to providing such power to the exciter stator 314.

Specifically, for the embodiment depicted, the electric generator assembly 300 includes a PMG rectifier 322. The PMG rectifier 322 converts the three-phase AC voltage from the PMG stator 310 into a DC voltage. Further, for the embodiment depicted, the electric generator assembly 300 includes a current modulator 324. The current modulator 324 is configured to modulate a current flow from PMG stator 310 to the exciter stator 314. In such a manner, the current modulator 324 may affect (e.g., reduce) an amount of voltage applied to terminals of the exciter stator 314, and thus the amount of current flow through the exciter stator 314. More specifically, for the exemplary embodiment shown the current modulator 324 is configured as a semi H-bridge configured to control the amount of voltage applied to the terminals of the exciter stator 314 by pulse-width-modulation of the two active switches, thus controlling an amount of current flow through the exciter stator 314. However, in other exemplary embodiments, the current modulator 324 may be configured in any other suitable manner, such as any other suitable voltage chopper configuration, such as a four-switch configuration, a single switch configuration, any other suitable pulse width modulation device, etc. Operation and control of the current modulator 324 will be described in more detail below.

The controlled DC voltage provided to the exciter stator 314 may generate a rotation field relative to the exciter rotor 312, and further may induce a voltage within a three-phase winding 326 of the exciter rotor 312. The exciter rotor 312 is configured to provide electrical power to the main generator rotor 316 of the main generator 306. As with the transfer of power from the PMG stator 310 to the exciter stator 314, the electric generator assembly 300 further includes features for conditioning the power provided from the exciter rotor 312 to the main generator rotor 316. Specifically, for the embodiment depicted, the electric generator assembly 300 includes an exciter rectifier 328 for receiving the three-phase AC voltage from the exciter rotor 312 and converting such electrical power to a DC voltage. It will be appreciated that the exciter rectifier 328 is, for the embodiment shown, configured to rotate with the exciter rotor 312, such that the exciter rectifier 328 may be referred to as a rotating rectifier.

Referring still to the schematic of FIG. 4, the DC voltage from the exciter rectifier 328 is applied to the main generator rotor 316 of the main generator 306. Rotation of the main generator rotor 316 relative to the main generator stator 318 may generate an electric power. Specifically, for the embodiment shown, the main generator stator 318 includes a first three-phase winding 330 and a second three-phase winding 332. The first and second three-phase windings 330, 332 are each configured to have a voltage induced therein by the main generator rotor 316. It will be appreciated, however, that the first three-phase winding 330 defines a phase shift 334 from the second three-phase winding 332 greater than zero degrees and less than 90 degrees. More specifically, for the embodiment shown, the first three-phase winding 330 defines a phase shift 334 from the second three-phase winding 332 between about 30 degrees and about 60 degrees, such as equal to approximately 30 degrees, and more specifically, equal to 30 degrees. As will be explained in greater detail below, such a configuration may reduce harmonics within electrical power output of the electric generator assembly 300.

Briefly, it will be appreciated that the phase shift 334 is depicted in FIG. 4 schematically, and not to scale. As used herein, the term "phase shift" refers to a circumferential position of one winding relative to another winding within a stator of an electric machine.

Referring still to the schematic of FIG. 4, each of the first and second three-phase windings 330, 332 are configured to generate a respective three-phase AC voltage. As such, the main generator 306 further includes a first main generator rectifier 336 downstream of the first three-phase winding 330 for converting the three-phase AC voltage from the first three-phase winding 330 into a DC voltage. Similarly, the main generator 306 further includes a second main generator rectifier 338 downstream of the second three-phase winding 332 for converting the three-phase AC voltage from the second three-phase winding 332 into a DC voltage.

Moreover, the electric generator assembly 300 includes a main generator interphase transformer 340. Main generator interphase transformer 340 is electrically coupled to both the first and second main generator rectifiers 336, 338 at a location downstream of both the first and second main generator rectifiers 336, 338. It will be appreciated, that for the embodiment shown, the main generator interphase transformer 340 of the electric generator assembly 300 is a single interphase transformer. More specifically, the interphase transformer 340 includes two branches, each coupled to one of the first and second main generator rectifiers 336, 338 at a location downstream of both the first and second main generator rectifiers 336, 338.

As will be appreciated, it is desired for each of the first and second three-phase windings 330, 332 to be able to operate with full 120 degree conduction in each phase, such that they are effectively operating as two stand-alone devices operating in parallel. The interphase transformer 340 prevents handoff of current between the first and second three-phase windings 330, 332 paths, such that neither has to carry twice the current load for half the amount of time. As will be appreciated, such reduces the losses in the system, increasing the efficiency. Put more succinctly, inclusion of the single interphase transformer 340 may limit a circulation of the current by the mutual impedance between the two branches of the interphase transformer 340.

It will be appreciated, however, that in other exemplary embodiments, the electric generator assembly 300 may include any other suitable number and/or configuration of interphase transformers.

Further, still, referring to the schematic of FIG. 4, the electric generator assembly 300 further includes a DC voltage output. More particularly, the electric generator assembly 300 includes positive DC voltage output 342 and a negative DC voltage output 344. In order to ensure a desired amount and level of power is being provided by the electric generator assembly 300, the electric generator assembly 300 further includes a DC current sensor 346 and a voltage clamp 348. The DC current sensor 346 is in electrical communication with the DC voltage output, and specifically with the positive DC voltage output 342, and the voltage clamp 348 in electrical communication with the DC voltage output, and specifically with the positive DC voltage output 342 and negative DC voltage output 344. In certain exemplary embodiments, the voltage clamp 348 may be configured as an active clamp having a transistor arranged in series with a resistor, with a gate controlled based on the, e.g., DC current sensor 346 to control an output voltage of the electric generator assembly 300.

Furthermore, as briefly noted above, the electric generator assembly 300 includes a power output control 350. The power output control 350 is configured to affect an amount of voltage induced in the first and second three-phase windings 330, 332 of the main generator stator 318 of the main generator 306. For the embodiment shown, the power output control 350 includes the DC current sensor 346 operable with the DC power output, and further includes a controller 352. The DC current sensor 346 may provide data to the controller 352 indicative of a current of the power provided from the main generator 306. The power output control 350 further includes a voltage sensor 349 for sensing data indicative of the voltage of the power provided from the main generator 306 in providing such data to the controller 352. The controller 352 may use a series of control schemes compared to a reference value 354 to determine whether or not any corrections are needed. Specifically, for the embodiment shown, the power output control 350 is operably coupled to the current modulator 324 located between the PMG stator 310 and the exciter stator 314. In such a manner, the power output control 350 may control the power output from the main generator 306 relative to the reference value 354 utilizing the current modulator 324.

More specifically, for the embodiment shown, the controller 352 of the power output control 350 may utilize a series of proportional integral controls 356. Each of the proportional integral controls 356 may generally include a summation block 357 that sums an input value (e.g., the reference value 354, or a feed forward value) and sensed data (e.g., from the DC current sensor 346 or voltage sensor 349 at a location downstream of the first and second main generator rectifiers 336, 336; from a current/voltage sensor 358 at a location downstream of the first and second three-phase windings 330, 332 and upstream of the first and second main generator rectifiers 336, 336; etc.). The summation block 357 may then provide forward a reference value. The reference value may be provided to a subsequent summary block, or may be converted to a "gating" value 360 provided to the current modulator 324.

In particular, for the embodiment shown, the power output control 350 includes a first proportional integral control 356A, a second proportional integral control 356B, and a third proportional integral control 356C. The first proportional integral control 356A includes a summation block 357 that sums the reference value 354 and data from the voltage sensor 349. The second proportional integral control 356B receives at block 362 the value from the summation block 357 of the first proportional integral control 356A and a feed forward value from the DC current sensor 346, the voltage sensor 349, or both. This value is provided to a summation block 357 of the second proportional integral control 356B, which is combined with data from the AC voltage sensor 358. The third proportional integral control 356C receives at block 364 the value from the summation block 357 of the second proportional integral control 356B and feed forward data from the DC current sensor 346, the voltage sensor 349, or both (as may be modified by a "gain" block 365). This value is provided to a summation block 357 of the third proportional integral control 356C, which is combined with data from a current sensor within at the current modulator 324 for sensing data indicative of a current to or through the exciter stator 314. The resulting value is provided to block 366, which is combined with feed forward data from the DC current sensor 346, the voltage sensor 349, or both (as may be modified by a second "gain" block 367) and provided to block 360 as the "gating" value 360.

It will be appreciated that the output control 350 may be carried out through one or more microprocessors, or any other suitable computing device. Further, it will be appreciated that the output control 350 is provided by way of example only and that in other exemplary embodiment, and other suitable output control 350/controller 352 may be provided. For example, in certain exempt embodiments, the controller 352 may further receive data from various other voltage and/or current sensors for sensing data indicative of voltage and current in other locations within the electric generator assembly 300.

For the embodiment shown, the electric generator assembly 300 is configured to provide DC power output at a high voltage, such as at a voltage greater than 120 Volts. In particular, for the embodiment shown, the electric generator assembly 300 is configured to provide DC power output at a voltage greater than or equal to approximately 270 Volts. It will be appreciated that such is a relatively high power output for an electric generator assembly 300 of an aircraft electrical system. However, by utilizing such a high power output, a weight of an electrical bus carrying such electrical power may be reduced, as less current is required for a given amount of electrical power to an electrical load.

Moreover, it will be appreciated that utilizing parallel three-phase windings 330, 332 within the main generator stator 318 of the main generator 306 defining a phase shift 334 in the manner described above may further allow for a reduction in weight of the electrical generator assembly. More specifically, the phase shift 334 of the first and second three-phase windings 330, 332 of the main generator stator 318 may reduce harmonics within the output power of the electric generator assembly 300, such that there is less of a need to correct/account for such ripple with heavy equipment, such as capacitors.

Therefore, the electric generator assembly 300 of the present disclosure may allow for a reduction in weight and improvement in efficiency for an electrical system including the electric generator assembly 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

An electric generator assembly for an aircraft comprising: a main generator comprising a main rotor and a main stator, the main stator comprising a first three-phase winding and a second three-phase winding, the first and second three-phase windings each configured to have a voltage induced therein by the main rotor, the first three-phase winding defining a phase shift from the second three-phase winding greater than zero degrees.

The electric generator assembly of one or more of these clauses, wherein the phase shift is approximately 30 degrees.

The electric generator assembly of one or more of these clauses, wherein the first and second three-phase windings are arranged in parallel.

The electric generator assembly of one or more of these clauses, wherein the main generator further comprises a first main generator rectifier downstream of the first three-phase winding and a second main generator rectifier downstream of the second three-phase winding.

The electric generator assembly of one or more of these clauses, wherein the first and second main generator rectifiers are electrically coupled to a main generator interphase transformer.

The electric generator assembly of one or more of these clauses, further comprising: an exciter comprising an exciter rotor and an exciter stator, wherein the exciter rotor applies an exciter voltage to the main rotor of the main generator through a rotating rectifier.

The electric generator assembly of one or more of these clauses, wherein the exciter voltage is a DC exciter voltage, and wherein the exciter further comprises an exciter rectifier for converting a three-phase AC exciter voltage to the DC exciter voltage.

The electric generator assembly of one or more of these clauses, further comprising: a permanent magnet generator (PMG) comprising a PMG rotor and a PMG stator, wherein the PMG stator provides a PMG voltage to the exciter stator.

The electric generator assembly of one or more of these clauses, further comprising: a current modulator for reducing a PMG current provided to the exciter stator.

The electric generator assembly of one or more of these clauses, wherein the electric generator assembly includes a power output control, wherein the power output control is operably coupled to the current modulator.

The electric generator assembly of one or more of these clauses, wherein the main generator comprises a DC power output, and wherein the electric generator assembly includes a power output control configured to affect an amount of voltage induced in the first and second three-phase windings, wherein the power output control comprises a DC current sensor operable with the DC power output.

The electric generator assembly of one or more of these clauses, wherein the main generator comprises a positive DC power output and a negative DC power output, and wherein the main generator further comprises a voltage clamp electrically coupled between the positive and negative DC power outputs.

The electric generator assembly of one or more of these clauses, wherein the main generator provides a high power DC power output.

An aircraft electrical system comprising: a combustion engine; and an electric generator assembly comprising a main generator comprising a main rotor and a main stator, the main generator rotor driven directly or indirectly by the combustion engine, the main stator comprising a first three-phase winding and a second three-phase winding, the first and second three-phase windings each configured to have a voltage induced therein by the main rotor, the first three-phase winding defining a phase shift from the second three-phase winding greater than zero degrees.

The electric generator assembly of one or more of these clauses, wherein the phase shift is approximately 30 degrees.

The electric generator assembly of one or more of these clauses, wherein the first and second three-phase windings are arranged in parallel.

The electric generator assembly of one or more of these clauses, wherein the main generator further comprises a first main generator rectifier downstream of the first three-phase winding and a second main generator rectifier downstream of the second three-phase winding.

The electric generator assembly of one or more of these clauses, wherein the first and second main generator rectifiers are electrically coupled to a main generator interphase transformer.

The electric generator assembly of one or more of these clauses, wherein the main generator provides DC power output at approximately 270 volts.

The electric generator assembly of one or more of these clauses, wherein the main generator comprises a positive DC power output and a negative DC power output, wherein the aircraft electrical system further comprises an electrical bus, and wherein the positive DC power output and a negative DC power output provide electrical power to the electrical bus of the aircraft electrical system.

What is claimed is:

1. An electric generator assembly for an aircraft comprising:
    a main generator comprising a main rotor and a main stator, the main stator comprising a first three-phase winding and a second three-phase winding, the first and second three-phase windings are arranged in parallel, have separate neutral points, and are each configured to have a voltage induced therein by the main rotor, the first three-phase winding defining a phase shift from the second three-phase winding,
    the main generator further comprises a first main generator rectifier configured to convert a three-phase AC voltage from the first three-phase winding into a DC voltage and a second main generator rectifier configured to convert a three-phase AC voltage from the second three-phase winding into a DC voltage, the first and second main generator rectifiers each having a first terminal and a second terminal,
    the main generator also comprises a single main generator interphase transformer having a first branch electrically coupled with the first terminal of the first main generator rectifier and a second branch electrically coupled with the first terminal of the second main generator rectifier, the second terminal of the first main generator rectifier and the second terminal of the second main generator rectifier are not electrically coupled with an interphase transformer, and
    wherein the first and second three-phase windings are paralleled through the single main generator interphase transformer.

2. The electric generator assembly of claim 1, wherein the phase shift is approximately 30 degrees.

3. The electric generator assembly of claim 1, wherein the first and second three-phase windings are configured to operate with full 120 degree conduction in each phase.

4. The electric generator assembly of claim 1, wherein the first branch and the second branch of the single main generator interphase transformer are electrically coupled with a first DC voltage output, and wherein the second terminal of the first main generator rectifier and the second terminal of the second main generator rectifier are directly electrically coupled with a second DC voltage output without an interphase transformer being positioned therebetween.

5. The electric generator assembly of claim 1, further comprising:
    an exciter comprising an exciter rotor and an exciter stator, wherein the exciter rotor applies an exciter voltage to the main rotor of the main generator through a rotating rectifier.

6. The electric generator assembly of claim 5, wherein the exciter voltage is a DC exciter voltage, and wherein the exciter further comprises an exciter rectifier for converting a three-phase AC exciter voltage to the DC exciter voltage.

7. The electric generator assembly of claim 5, further comprising:
    a permanent magnet generator (PMG) comprising a PMG rotor and a PMG stator, wherein the PMG stator provides a PMG voltage to the exciter stator.

8. The electric generator assembly of claim 7, further comprising:
    a current modulator for reducing a PMG current provided to the exciter stator.

9. The electric generator assembly of claim 8, wherein the electric generator assembly includes a power output control, wherein the power output control is operably coupled to the current modulator.

10. The electric generator assembly of claim 1, wherein the main generator comprises a DC power output, and wherein the electric generator assembly includes a power output control configured to affect an amount of voltage induced in the first and second three-phase windings, wherein the power output control comprises a DC current sensor operable with the DC power output.

11. The electric generator assembly of claim 1, wherein the main generator comprises a positive DC power output and a negative DC power output, and wherein the main generator further comprises a voltage clamp electrically coupled between the positive and negative DC power outputs, wherein the voltage clamp is configured as an active clamp having a transistor arranged in series with a resistor.

12. The electric generator assembly of claim 1, wherein the main generator provides a high power DC power output.

13. An aircraft electrical system comprising:
    a combustion engine; and
    an electric generator assembly comprising a main generator comprising a main rotor and a main stator, the main generator rotor driven directly or indirectly by the combustion engine, the main stator comprising a first three-phase winding and a second three-phase winding, the first and second three-phase windings are arranged in parallel, have separate neutral points, and are each configured to have a voltage induced therein by the main rotor, the first three-phase winding defining a phase shift from the second three-phase winding greater than zero degrees,
    the main generator further comprises a first main generator rectifier configured to convert a three-phase AC voltage from the first three-phase winding into a DC voltage and a second main generator rectifier configured to convert a three-phase AC voltage from the second three-phase winding into a DC voltage, the first and second main generator rectifiers each having a first terminal and a second terminal,
    the main generator also comprises a single main generator interphase transformer having a first branch electrically coupled with the first terminal of the first main generator rectifier and a second branch electrically coupled with the first terminal of the second main generator rectifier, the second terminal of the first main generator rectifier and the second terminal of the second main generator rectifier are not electrically coupled with an interphase transformer, and
    wherein the first and second three-phase windings are paralleled through the single main generator interphase transformer.

14. The aircraft electrical system of claim 13, wherein the phase shift is approximately 30 degrees.

15. The aircraft electrical system of claim 13, wherein the first and second three-phase windings are configured to operate with full 120 degree conduction in each phase.

16. The aircraft electrical system of claim 13, wherein the first branch and the second branch of the single main generator interphase transformer are electrically coupled with a first DC voltage output, and wherein the second terminal of the first main generator rectifier and the second terminal of the second main generator rectifier are directly electrically coupled with a second DC voltage output without an interphase transformer being positioned therebetween.

17. The aircraft electrical system of claim 13, wherein the main generator comprises a positive DC power output and a negative DC power output, wherein the aircraft electrical system further comprises an electrical bus, and wherein the positive DC power output and a negative DC power output provide electrical power to the electrical bus of the aircraft electrical system.

18. An electric generator assembly for an aircraft comprising:
   a main generator comprising a main rotor and a main stator, the main stator comprising a first three-phase winding and a second three-phase winding, the first and second three-phase windings have separate neutral points and are each configured to have a voltage induced therein by the main rotor, the first three-phase winding defining a phase shift from the second three-phase winding, the main generator further comprises a first main generator rectifier configured to convert a three-phase AC voltage from the first three-phase winding into a DC voltage and a second main generator rectifier configured to convert a three-phase AC voltage from the second three-phase winding into a DC voltage, the first and second main generator rectifiers each having a first terminal and a second terminal, the main generator also comprises a single main generator interphase transformer having a first branch electrically coupled with the first terminal of the first main generator rectifier and a second branch electrically coupled with the first terminal of the second main generator rectifier, the second terminal of the first main generator rectifier and the second terminal of the second main generator rectifier are directly electrically coupled with a negative DC voltage output, and wherein the first and second three-phase windings are paralleled through the single main generator interphase transformer.

* * * * *